United States Patent
Bostick et al.

(10) Patent No.: US 10,693,823 B2
(45) Date of Patent: Jun. 23, 2020

(54) DYNAMIC MESSAGE CONTENT FILTER

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/129,891

(22) Filed: Sep. 13, 2018

(65) Prior Publication Data

US 2020/0092238 A1 Mar. 19, 2020

(51) Int. Cl.
H04L 12/58 (2006.01)
(52) U.S. Cl.
CPC ............ *H04L 51/12* (2013.01); *H04L 51/063* (2013.01); *H04L 51/18* (2013.01)
(58) Field of Classification Search
CPC ........ H04L 51/12; H04L 51/063; H04L 51/18
USPC ........................................................ 709/206
See application file for complete search history.

(56) References Cited

U.S. PATENT DOCUMENTS

| 7,076,241 B1 * | 7/2006 | Zondervan ............ H04L 51/063 379/100.08 |
| 9,183,306 B2 | 11/2015 | Robarts et al. |
| 9,369,988 B1 * | 6/2016 | Johnson ................... H04W 4/10 |
| 9,420,970 B2 | 8/2016 | Dagum |
| 2002/0194286 A1 * | 12/2002 | Matsuura ............. G06Q 10/107 709/206 |
| 2005/0027669 A1 | 2/2005 | Day et al. |
| 2009/0013052 A1 | 1/2009 | Robarts et al. |
| 2009/0311992 A1 * | 12/2009 | Jagetiya .................. H04L 51/14 455/412.1 |
| 2010/0223341 A1 | 9/2010 | Manolescu et al. |
| 2010/0274856 A1 * | 10/2010 | Bhadriraju ........... G06Q 10/107 709/206 |

(Continued)

OTHER PUBLICATIONS

Peter Mell et al, The NIST Definition of Cloud Computing, National Institute of Standards and Technology, Publication 800-145, 2011, entire document.

(Continued)

*Primary Examiner* — James E Springer
(74) *Attorney, Agent, or Firm* — Patrick J. Daugherty; Daugherty & Del Zoppo Co., LPA

(57) ABSTRACT

Embodiments determine message text content amount limits as a function of recipient context, wherein in some embodiments processors are configured to determine whether a physical proximity distance of a recipient of an electronic message to another, identified person is within a minimum specified threshold distance. In response to determining that the physical proximity distance is within the minimum specified threshold distance, some embodiments compare a total amount of text content of the message to a threshold maximum content value; and, in response to determining that the total amount of the message text content exceeds the threshold maximum content value, notify a sender of the message that the threshold maximum content value currently applies to messages sent to the recipient.

18 Claims, 5 Drawing Sheets

(56) References Cited

U.S. PATENT DOCUMENTS

2016/0191437 A1* 6/2016 Thomas ................. H04W 4/12
  709/206
2017/0353840 A1   12/2017 Bostick et al.
2018/0176163 A1*  6/2018 Arquero ............... H04L 51/063
2018/0192126 A1*  7/2018 Marci .................... A61B 3/112

OTHER PUBLICATIONS

Thorben Janssen, How to Specify and Handle Exceptions in Java, Developer Tips, Tricks & Resources, https://Stackify.com/developers, 2017, entire document.
Frederic Parain, JEP 270: Reserved Stack Areas for Critical Sections, OpenJDK, Oracle Corporation, 2018, entire document.

* cited by examiner

US 10,693,823 B2

DYNAMIC MESSAGE CONTENT FILTER

BACKGROUND

Electronic messaging refers to a variety of systems and processes that enable dynamic, real-time, one-to-one communications between persons irrespective of their actual, physical locations. Persons may thereby conduct on-going conversations, even where they are physically remote from each other or otherwise unable to conduct a conventional, verbal conversation. Illustrative but not limiting or exhaustive examples of electronic messaging include chat, instant message and text messaging, Simple Mail Transfer Protocol (SMTP) and other email messaging, and pager messaging.

SUMMARY

In one aspect of the present invention, a computerized method includes executing steps on a computer processor. Thus, a computer processor is configured to determine whether a physical proximity distance of a recipient of an electronic message to another, identified person is within a minimum specified threshold distance. In response to determining that the physical proximity distance to the identified person is within the minimum specified threshold distance, the configured processor compares a total amount of text content of the message to a threshold maximum content value; and, in response to determining that the total amount of the message text content exceeds the threshold maximum content value, notifies a sender of the message that the threshold maximum content value currently applies to messages sent to the recipient.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine a reception device limit value that is applicable to a device currently used by the recipient to receive an electronic message as a function of an attribute of the device. The processor further determines an activity limit value as a function of an activity context of the recipient; determines a cognitive state message limit value as a function of a cognitive state of the recipient; sets a threshold maximum content value as a function of the reception device limit value, the activity limit value and the cognitive state message limit value; and in response to determining that the total amount of the message text content exceeds the threshold maximum content value, notifies a sender of the message that the threshold maximum content value currently applies to messages sent to the recipient.

In another aspect, a computer program product for determining message text content amount limits as a function of recipient context has a computer-readable storage medium with computer readable program code embodied therewith. The computer readable program code includes instructions for execution which cause the processor to determine whether a physical proximity distance of a recipient of an electronic message to another, identified person is within a minimum specified threshold distance. The processor is further configured to, in response to determining that the physical proximity distance to the identified person is within the minimum specified threshold distance, compare a total amount of text content of the message to a threshold maximum content value; and, in response to determining that the total amount of the message text content exceeds the threshold maximum content value, notify a sender of the message that the threshold maximum content value currently applies to messages sent to the recipient.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
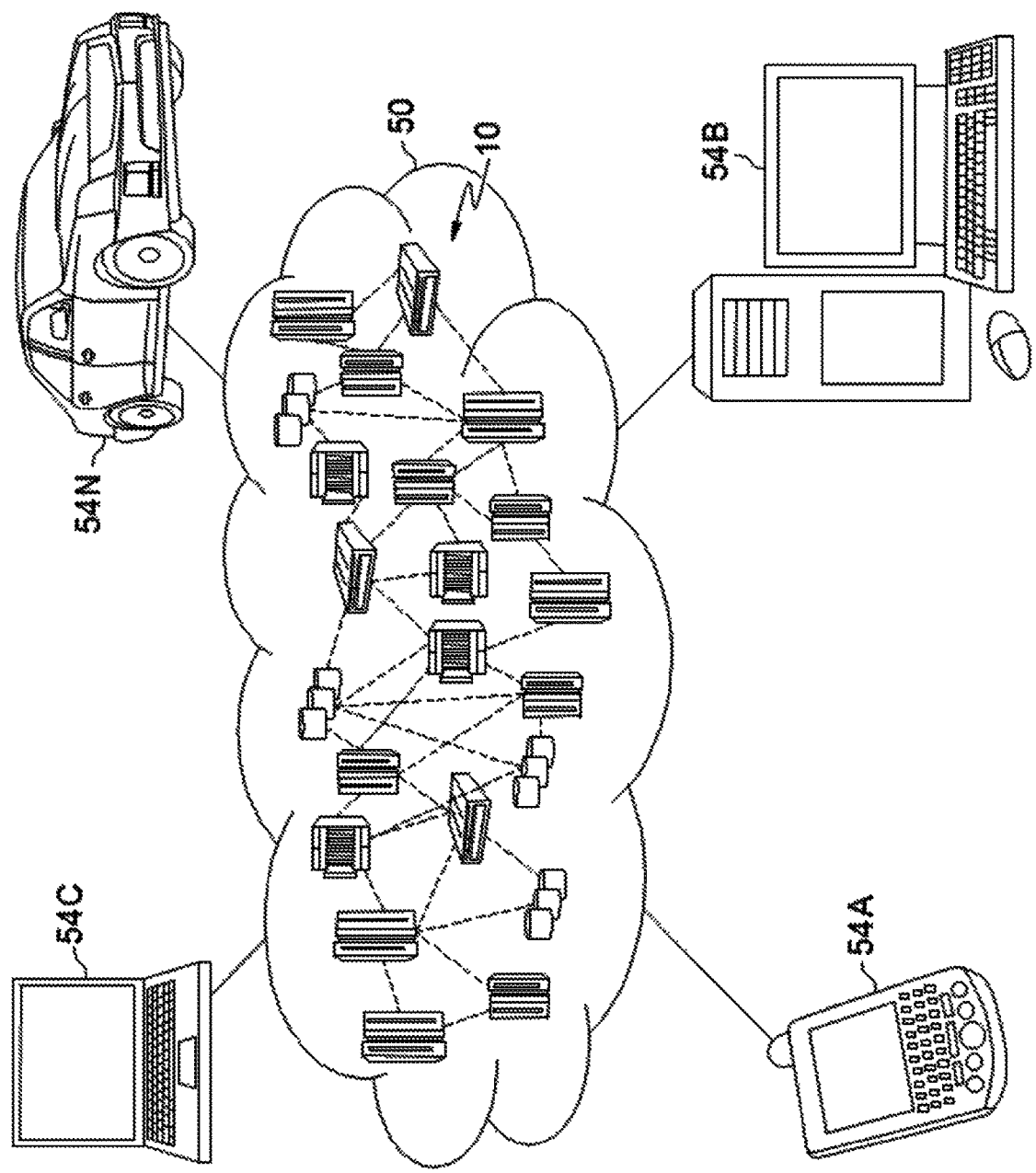
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
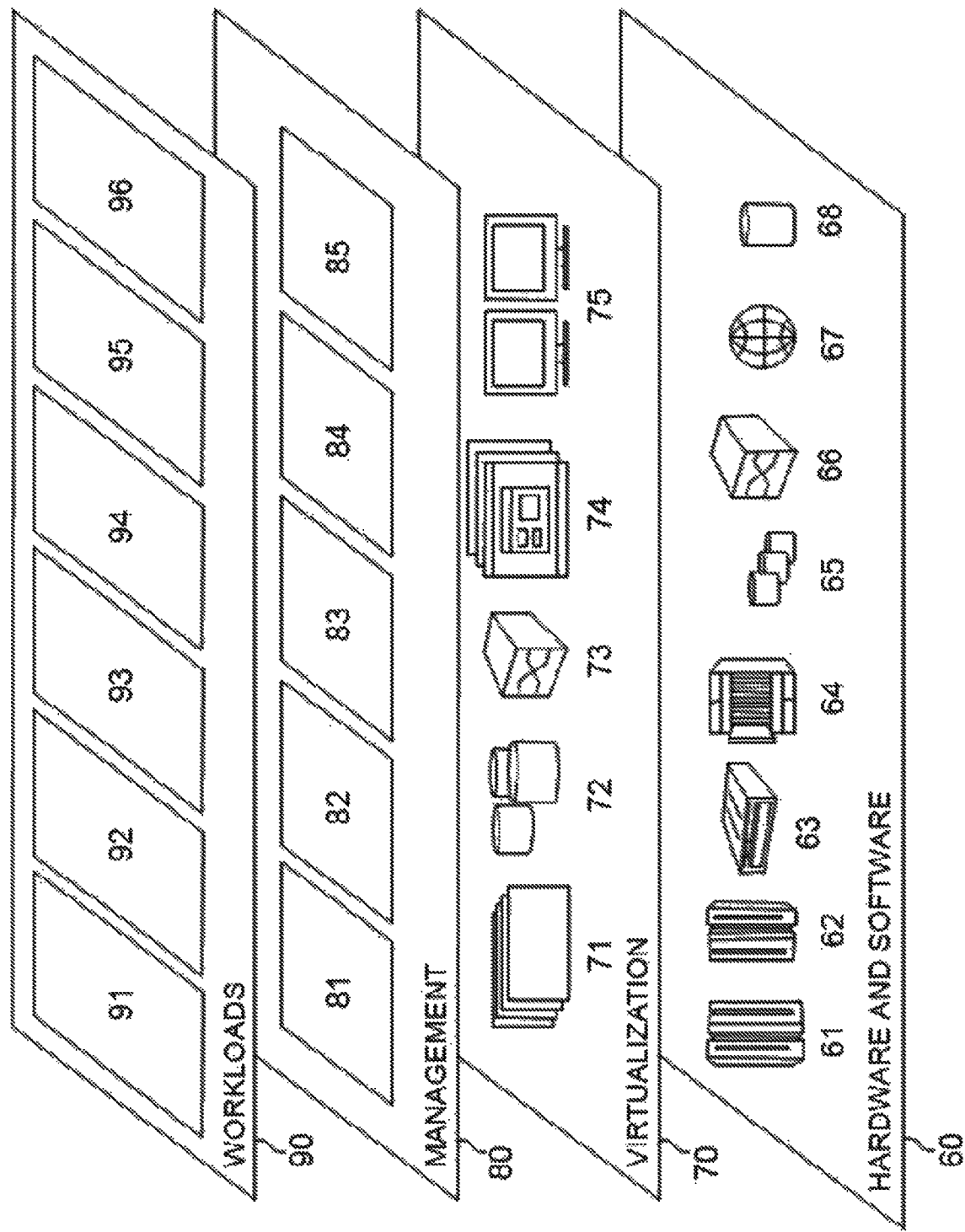
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing to determine message text content amount limits as a function of recipient context according to aspects of the present invention 96.

Figure 3:
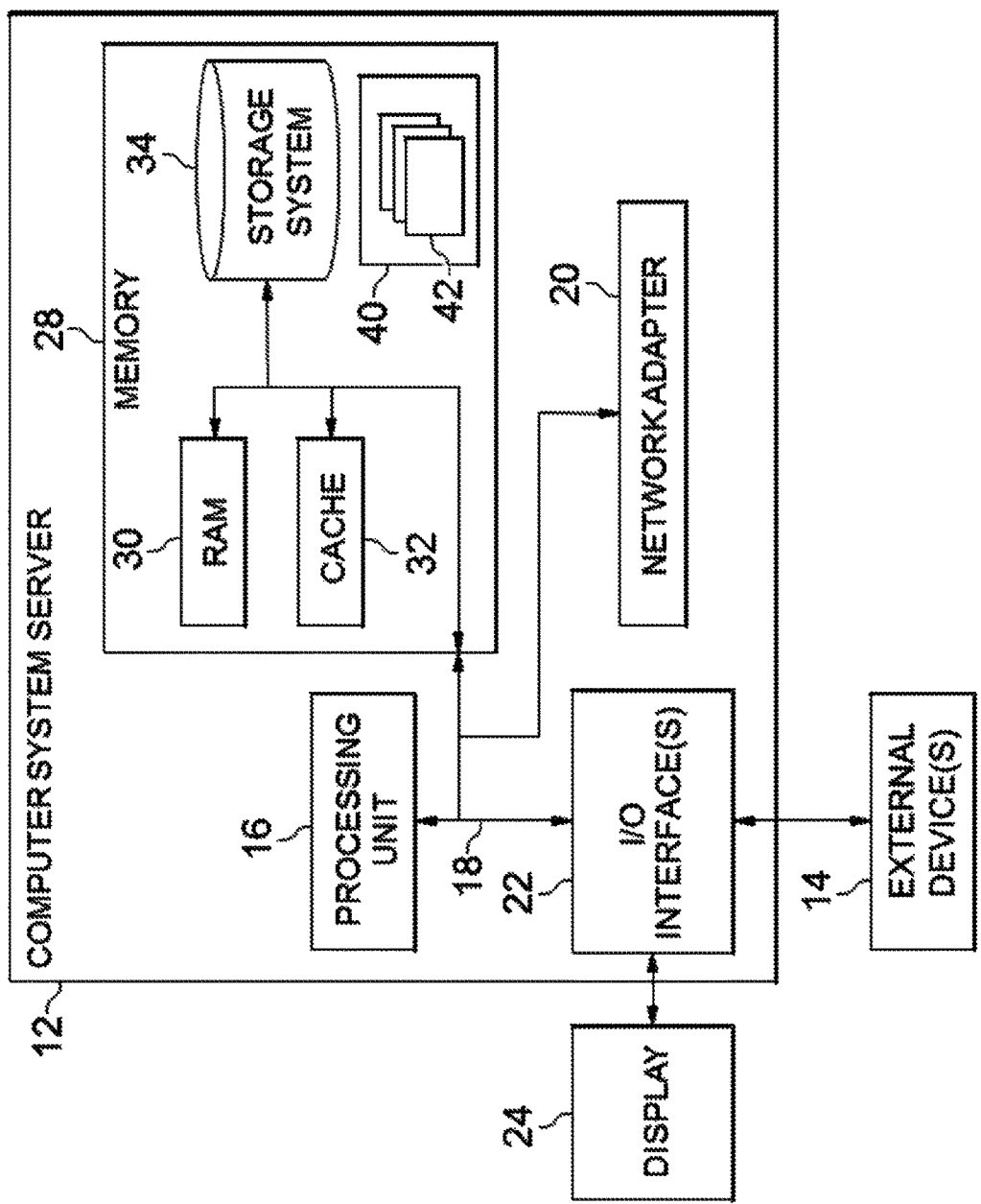
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

Figure 4:
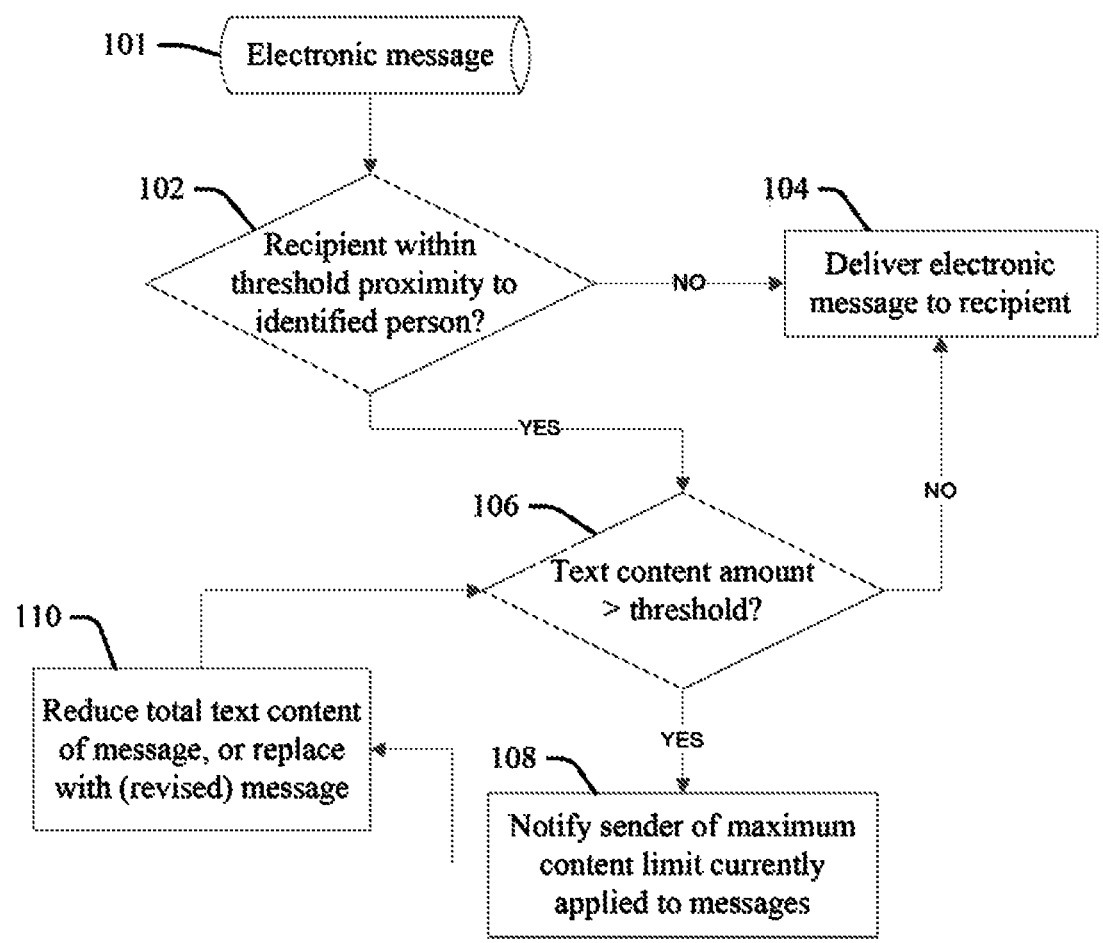
FIG. 4 is a flow chart illustration of one embodiment of the present invention.

FIG. 4 illustrates a system, process or device according to one embodiment of the present invention. At 102 a processor configured according to the present invention (the "configured processor"), in response to receipt of an electronic message 101, determines whether a physical proximity of recipient person (the "recipient") of the electronic message

101 to another, specific person (the "identified person") is within a minimum specified threshold distance.

In response to determining that said physical proximity to the identified person is not within the minimum specified threshold distance, at 104 the configured processor receives, publishes on a graphic user interface (GUI) display device, processes or otherwise delivers the electronic message to the recipient.

In response to determining that the physical proximity to the identified person is within the minimum specified threshold distance, at 106 the configured processor compares a total character length, word count or other text content amount metric limit of the electronic message to a threshold maximum. In response to determining that the text content amount does not exceed the threshold maximum, at 104 the configured processor delivers the electronic message to the recipient.

In response to determining that the text content amount exceeds the threshold maximum, at 108 the configured processor notifies the person sending the message (the "sender") that the maximum character length, word count, etc., limit currently applies to their messages. In some embodiments the notification is banner information displayed in association with an entry field in a GUI used by the sender to compose and send messages: for example; "Tim is currently busy and a 30-character limit applies to any new text message" is displayed above or otherwise in association with a text message entry window field displayed to the sender for entry of a new text message to the recipient "Tim."

At 110 the configured processor automatically revises the message by reducing the total text content to comply with the limit; or receives a revised or replacement message from the sender. Accordingly, the revised message is again reviewed at 106 to verify that it meets the applicable maximum text content amount limit, for delivery of the revised or reduced message to the recipient at 104.

Thus, embodiments of FIG. 4 impose limits on message length in response to determining that a person identified as impactful to the cognitive abilities or attention of the recipient is within the minimum specified ("impactful," "influencing," etc.) threshold distance. The identified person is generally one having a relationship to the recipient, such as a co-worker of the recipient in a work context, an instructor in an educational context, a family member (spouse, parent, child, etc.) or a social contact (friend, sporting or gaming or other organization teammate, colleague, or opponent, etc.), wherein the presence of such an identified person within the applicable threshold proximity distance is likely to impact the ability of the recipient to process and respond to a long message. Accordingly, the embodiments limit the length, size or complexity of text content of an incoming message so that only a short, more-rapidly and readily understood message is received, increasing the likelihood that the recipient will read and respond to the message.

Embodiments of the present invention may define variable proximity distances and associated messaging limits for each identified, proximate person. For example, embodiments may determine that any text message to the recipient must meet a 20-character limit in response to determining that the recipient is within twenty (20) feet of a co-worker of the recipient, reflecting a presumption that the attention of the recipient is likely in the same room or otherwise within the scope of a likely engagement with the co-worker, including with respect to a related work task, during the duration of such a proximity to the co-worker, wherein 20-character limited messages are more likely to be read and processed by the recipient while proximate to this co-worker. In contrast, a 50-character limit may be selected in response to determining that the recipient is within ten (10) feet of a friend, family or other social network contact after the end of a scheduled work-day, reflecting a presumption that the attention of the recipient is likely focused on engaging the proximate social contact, and therefore, that messages greater than 50 characters are too long for attention without unduly intruding upon the social engagement, and are likely to be ignored until the social engagement is terminated (determined by the social contact moving away from the recipient to a distance greater than 10 feet).

Figure 5:
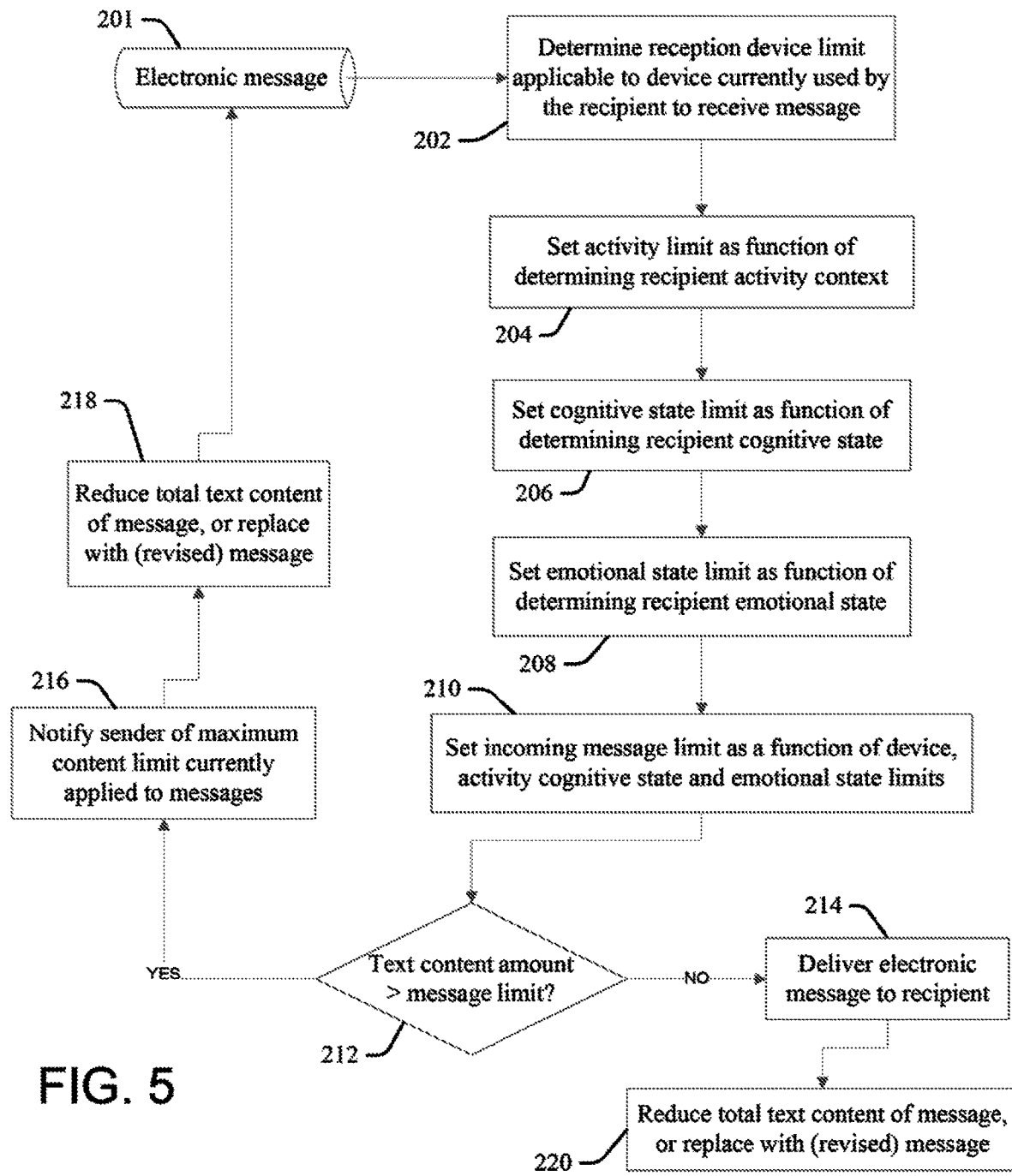
FIG. 5 is a flow chart illustration of another embodiment of the present invention.

FIG. 5 illustrates another embodiment of the present invention that dynamically determines recipient message character limits as a function of recipient and messaging device attributes or context, including current activity, context and cognitive state of the recipient. At 202 a processor configured according to the present invention (the "configured processor") defines or determines a reception device limit value or score that is applicable to a device currently used by the recipient to receive an electronic message 201 from a sender as a function of an attribute of the device. The active device may be any of a plurality of devices of the recipient that are available for receiving the message and that have different functional attributes that effect their display. For example, the configured processor determines or selects an active device message limit value of one thousand (1000) characters for a message received on a laptop computer or tablet device, and a lower, one hundred (100) character limit to apply to messages received on a smart phone, wherein the lower limit is selected due to the smaller relative screen size and corresponding lesser recipient ability to efficiently read and respond to messages, or to determining a higher likelihood of engaging in other, competing activities while operating the smart phone, etc.

At 204 the configured processor determines an activity limit value or score as a function of determined activity context for the recipient. For example, the configured processor sets or selects the activity limit value to an absolute or message-blocking value of zero (0) characters in response to determining that the recipient is driving a vehicle; to a 20-character limit in response to determining that the recipient is within ten (10) feet of a co-worker of the recipient, as discussed above with respect to FIG. 4; to a limit of fifty (50) characters in response to determining that the recipient is engaged in a phone call; to a one hundred (100) character limit in response to determining that the recipient is in a work meeting, for messages from co-worker, or other work-related senders, and to fifty (50) characters anyone else during that same context/time duration; to a limit of 500 characters in response to determining that the recipient is working at his or her office desk; and to a limit of 1000 characters in response to determining that the recipient is home and not otherwise engaged in work activities (watching TV, listening to music, playing a game, etc.)

The configured processor may determine activity and reception location context data used to choose activity limits at 204 from mobile telephone device or wearable sensor location and biometric data. Thus, embodiments of the configured processor may determine current geographic location from global positioning satellite (GPS), data, cellular tower connection data and time stamps, time-stamped local network ports and communication transmission, calendar appointment location data, and historical location data for current time period and date, etc. The configured processor may infer or otherwise determine a type of current recipient activity (running, bicycling, traveling on mass transit, etc.), from smartwatch or activity tracker motion direction and speed and location data, gyroscope and altimeter sensor data, etc.

At 206 the configured processor determines or sets cognitive state message limits or scores as a function of determining a cognitive state of the recipient. Thus, in one example the configured processor sets or selects an "Attention level 1 (highly focused)" limit of 50 characters in response to determining that the recipient is highly focused on an activity; an "Attention level 2 (moderately focused)" limit of 100 characters in response to determining that the recipient is less focused on an activity, for example, is multi-tasking, or browsing a news feed, etc.; and an "Attention level 3 (low focus)" limit of 500 characters in response to determining that the recipient is not focused on any single, identifiable activity. The configured processor may determine cognitive state message limits at 206 as a function of processing eye-focus data obtained from smart-phone cameras, or interaction data with respect to information displayed on a display screen (for example, total times taken to read and process and respond to input data, typing response times and other interaction patterns indicative of the rate at which the recipient is reading content associated with typing responses, etc.); and still other determinations will be apparent to one skilled in the art.

At 208 the configured processor sets emotional state message limits or scores as a function of determining an emotional state of the recipient. In one example, the configured processor sets or selects an "Emotion 1 (upset)" limit of 50 characters in response to determining that the recipient is sad, crying, angry, or in an agitated state that is presumed to interfere with processing and responding to new messages; an "Emotion 2 (happy, smiling)" limit of 100 characters in response to determining that, while the recipient is in an excited state that may interfere with getting quality attention from the recipient, the state is a positive state that is more likely to result in processing and response to a new message than the "Emotion 1-upset" state context; and an "Emotion 3 (calm)" limit of 500 characters in response to determining that the recipient is calmer and more able to focus and efficiently process and respond to a long message, relative to the upset or happy contexts.

The configured processor may determine recipient emotional attribute scoring values used in selection of an appropriate emotional state message limit at 208 from wearable biometric data indicative of heart rate (beats-per-minute, or BPM), or facial expressions recognized within image data obtained from smart phone cameras, such as by matching facial image data to labelled images within trained data; and still other examples will be apparent to one skilled in the art.

At 210 the configured processor determines, sets or selects an incoming message limit as a function of the active device message limit or score determined at 202, the recipient activity limit value or score determined at 204, the cognitive state message limit or score determined at 206 and the emotional state message limit or score determined at 208. A variety of processes and method may be used to select and set the incoming message limit. In some examples the configured processor selects a lowest of the limits selected at 202, 204, 206 and 208, taking a "lowest common denominator" approach to determine the message limit.

The configured processor may also arbitrate between the different values to determine the message limit at 210, including based on differences in relative weightings. For example, the weighting of the zero character limit assigned at 204 in response determining that the recipient is driving may outweigh all other scores/limits at 202, 206 and 208 for selection, regardless of the actual limit value; or the maximum limit be selected as the 500 character emotional state limit set for a recipient at 208 in response to determining that the recipient is in a calm emotional state, in response to this limit having a higher weighting than a lower "Attention level 2 (moderately focused)" limit of 100 characters set at 206.

Determination of the incoming message limit at 210 may also be as an average function of the different limit values or scores set at 202, 204, 206 and 208, including by weighting some more highly than others. For example, the 500-character emotional state limit set for a recipient at 208 in response to determining that the recipient is in a calm emotional state may be given a higher weighting in determining the message character limit at 210 than the "Attention level 2 (moderately focused)" limit of 100 characters set at 206, wherein the resultant limit set at 210 is higher than a straight averaging of the respective limit values.

At 212 the configured processor compares a total character length, word count or other text content amount metric limit of the electronic message to the message limit set at 210. In response to determining that the text content amount does not exceed the message limit, at 214 the configured processor delivers the electronic message to the recipient.

In response to determining that the text content amount exceeds the message limit, at 216 the configured processor notifies the person sending the message (the "sender") that the maximum character length, word count, etc., limit currently applies to their messages, and at 218 automatically revises the message by reducing the total text content to comply with the limit; or receives a revised or replacement message from the sender. Accordingly, the revised message is input as the message under consideration at 201, wherein the process iteratively updates the limits set at 202, 204, 206, 208 and 210 in response to current recipient conditions is applying an appropriate limit to the revised message at 212.

At 220 the configured processor adjusts the limit values or weighting determined at 202, 204, 206, 208 and 210 in a learning feedback process. For example, the configured processor adjusts one or more of the respective character limit or word count values or weights in response to observing correlations to reading speeds of the recipient during the different activity, context or cognitive states of the recipient. Thus, in response to determining that the recipient historically or regularly processes messages longer than a recommended limit for a given device or recipient context or state, the configured processor may adjust the respective limit value upward to reflect the better-than expected processing abilities of this recipient during the correlated context or state.

Thus, aspects of the present invention dynamically determine text content amount limits that can be sent to a recipient and made known to authorized sending parties as a function of recipient context defined by one or more of active receiving device type, recipient activity and context, and the cognitive state (attention level, emotional state, etc.) of the recipient. The different determination may be used to generate an overall limit of message reception, in response to scoring the recipient's ability to read, process and respond to a given message, based on individual recipient criteria or combinations thereof, with respect to device type, activity and context, and the cognitive state of the recipient.

In applying the appropriate, selected text content limits to incoming messages embodiments of the present invention may deploy one or more of a variety of processes. In some embodiments the configured processor stops delivery of the message, and notifies the sender that the message has been stopped due to exceeding a specified text content length, and requests that sender revise the message, or replace it with another, to meet the specified, applicable limit, which is verified to comply with the maximum character length in order to effect delivery to the recipient.

Some embodiments automatically truncate incoming message text content to the maximum length, wherein some embodiments also send a notification message back to the sender that includes the truncated, remainder text, thereby directly notifying the sender of the content that has been delivered, wherein the sender is thereby enabled to decide whether the truncated message is satisfactory, or whether another message compliant with limit should be sent in follow-up (such as to supply any missing information lost in the truncation).

Some embodiments automatically filter the text content at 110 to remove lower-ranked or priority text content until the limit is met and deliver the filtered text content to the recipient at 104. For example, in response to determining that the following message exceeds an applicable 50-character or 10-word text limit ("But I still have that voucher for McDonald's! What about that instead? They have the biggest milkshakes you've ever seen."), the configured processor uses Natural Language Processing (NLP) to rank individual text words in order of uniqueness and importance in conveying overall message content, drops pronouns and repeated word occurrences and text content having meanings that likely lower in importance, and replaces recognized names with abbreviations (likely) known to recipient and sender, to generate the following filtered message that is delivered to the recipient at 104: "Have McD voucher, let's have milkshakes instead."

While electronic messaging provides for convenient and efficient options for directly engaging a message recipient in communication, in some situations a participant may be limited in ability to process and respond to a given message. The participant may be busy, engaged in other, possibly multiple activities, each of which may require varying amounts of priority or attention. Thus, participants may have only limited time to read and respond to a given message, sometimes not enough to adequately process and reply to a long message, or one with complex or demanding content. Thus, while the participant may be able to quickly review and adequately reply to short or simple content message, replies may be inadequate or associated processing of content unfeasible in the case of long, detailed or complex content message.

Moreover, the message processing context of a recipient may change during an exchange of messages. For example, a recipient may become distracted by the sudden occurrence or receipt of a more important message or priority task that arises during a conversation, such as a message from another person that has a higher priority for attention, wherein the recipient may experience a dynamic decrease in ability to read and reply to any other given message. Similarly, competing or disabling tasks or contexts may suddenly abate, resolve, end or otherwise change, increasing the ability of a recipient to response to subsequent messages in a given conversation.

Prior art messaging systems and processes are deficient in enabling message senders to dynamically, in real-time, assess the abilities of a message recipient to process and response to given message as a function of content of the message. While a sender may estimate, infer or otherwise gauge recipient response abilities from the adequacy or timeliness of a previous response, the prior art generally gives no notice to the sender of current, specific recipient attributes, or changes in current abilities, attention spans of time, or other cognitive states of message recipients.

For example, the prior art is deficient in accurately conveying to a message sender an understanding as to whether a recipient is too busy to read and respond to a long message. Prior art messaging options may automatically reply with a current recipient status indicating that no messages are being received and processed at current time, for example, "I am unavailable at this time" or " . . . in a meeting", or "I am presently driving, and my do-not-disturb settings will not convey your message at this time." Privacy lists may filter messages when deployed, entirely blocking messages from some senders regardless of the size or complexity or other nature of the message content for given period of time. Senders utilizing the prior art generally rely upon their own inferences as to the meaning of delays in responses, or long time periods between responses and receptions of messages as indicated in time-stamped message receipts, which may result in guessing that the recipient is too busy to respond.

In contrast, embodiments of the present invention determine and communicate to a sender indications that, while the recipient is too busy to fully read and respond to long or complex messages, the recipient is currently able to read and satisfactorily respond to shorter, less-complex or otherwise limited messages that comply with the limits conveyed, or directly applied, by the embodiments. The prior art fails to indicate to the sender that it is the length or complexity, etc., of the incoming message that is causing the delay in response, not any limitations in general availability of the recipient. In contrast, by understanding or otherwise defining a recipient's current cognitive state, embodiments of the present invention clearly and directly inform the sender that the recipient is now available for engaging in short, less-complex messages, though not for long, complex messages. Embodiments notify senders of specific limits upon the amounts or complexity of information that the recipient can process for given context, indicating that subsequent messages need to be shortened or otherwise reduced or simplified to enable improved and more efficient message processing by a recipient (with regard to time or effort) during an exchange of electronic messaging, thereby directly influencing or changing message content into a forms relevant to improving the generation of satisfactory replies to a given message.

Embodiments of the present invention that use NLP or other processes to summarize or otherwise reduce original message length or content into summarized, prioritized content that is populated to messages conveyed to the recipient provide further efficiency advantages over the prior art. Such embodiments reduce the amount of text content that must be read and processed and replied-to within an original message, providing proportional time-savings over the time and effort required by the recipient to process the original message sent on passively in the prior art. By helping the recipient quickly read or otherwise process message content, embodiments of the present invention enable faster response message creation and reply, by or on behalf of the recipient.

What is claimed is:
1. A computer-implemented method, comprising executing on a computer processor:
   in response to receipt of an electronic message, determining whether a physical proximity distance of a recipient of the electronic message to another, identified person is within a minimum specified threshold distance;

determining a reception device limit value that is applicable to a device currently used by the recipient to receive the electronic message as a function of an attribute of the device;

determining an activity limit value as a function of an activity context of the recipient;

determining a cognitive state message limit value as a function of a cognitive state of the recipient;

setting a threshold maximum content value as a function of the reception device limit value, the activity limit value and the cognitive state message limit value;

in response to determining that the physical proximity distance to the identified person is within the minimum specified threshold distance, comparing a total amount of text content of the message to a threshold maximum content value;

in response to determining that the total amount of the message text content exceeds the threshold maximum content value, automatically revising the text content of the message by reducing the total text content to a reduced amount of the text content that does not exceed the threshold maximum content value; and delivering the message with the reduced amount of the text content to the recipient.

2. The method of claim 1, further comprising:

setting the threshold maximum content value as a function of a relationship of the identified person to the recipient.

3. The method of claim 1, further comprising:

in response to determining that the total amount of the message text content exceeds the threshold maximum content value, notifying a sender of the message that the threshold maximum content value currently applies to messages sent to the recipient.

4. The method of claim 3, wherein the notifying comprises displaying banner information in association with an entry field in a graphical user interface display used by the sender to compose and send messages to the recipient.

5. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the determining whether the physical proximity distance of the recipient of the electronic message to the identified person is within the minimum specified threshold distance, the comparing the total amount of text content of the message to a threshold maximum content value, the automatically revising the text content of the message by reducing the total text content to the reduced amount of the text content that does not exceed the threshold maximum content value, and the delivering the message with the reduced amount of the text content to the recipient.

6. The method of claim 5, wherein the computer-readable program code is provided as a service in a cloud environment.

7. The method of claim 1, further comprising:

setting the threshold maximum content value to the lowest value of the reception device limit value, the activity limit value and the cognitive state message limit value.

8. The method of claim 1, further comprising:

determining that the cognitive state of the recipient matches a corresponding one of a group of emotional states that comprises upset, happy and calm emotional states; and setting the cognitive state message limit value to a limit value that is associated to the matching corresponding one of the group of emotional states.

9. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

in response to receipt of an electronic message, determines a reception device limit value that is applicable to a device currently used by a recipient to receive the electronic message as a function of an attribute of the device;

determines an activity limit value as a function of an activity context of the recipient;

determines a cognitive state message limit value as a function of a cognitive state of the recipient;

sets a threshold maximum content value as a function of the reception device limit value, the activity limit value and the cognitive state message limit value; and in response to determining that a total amount of the message text content exceeds the threshold maximum content value, notifies a sender of the message that the threshold maximum content value currently applies to messages sent to the recipient.

10. The system of claim 9, wherein the processor executes the program instructions stored on the computer-readable storage medium via the computer readable memory and thereby notifies the sender by displaying banner information in association with an entry field in a graphical user interface display used by the sender to compose and send messages to the recipient.

11. The system of claim 9, wherein the processor executes the program instructions stored on the computer-readable storage medium via the computer readable memory and thereby:

in response to determining that the total amount of the message text content exceeds the threshold maximum content value, automatically revises the text content of the message by reducing the total text content to a reduced amount of the text content that does not exceed the threshold maximum content value; and delivers the message with the reduced amount of the text content to the recipient.

12. The system of claim 9, wherein the processor executes the program instructions stored on the computer-readable storage medium via the computer readable memory and thereby:

determines that the cognitive state of the recipient matches a corresponding one of a group of emotional states that comprises upset, happy and calm emotional states; and sets the cognitive state message limit value to a limit value that is associated to the matching corresponding one of the group of emotional states.

13. The system of claim 9, wherein the processor executes the program instructions stored on the computer-readable storage medium via the computer readable memory and thereby:
- determines whether a physical proximity distance of the recipient of the electronic message to another, identified person is within a minimum specified threshold distance;
- in response to determining that the physical proximity distance to the identified person is within the minimum specified threshold distance, compares the total amount of text content of the message to the threshold maximum content value; and
- in response to determining that the total amount of the message text content exceeds the threshold maximum content value, notifies the sender of the message that the threshold maximum content value currently applies to messages sent to the recipient.

14. The system of claim 13, wherein the processor executes the program instructions stored on the computer-readable storage medium via the computer readable memory and thereby:
- sets the threshold maximum content value as a function of a relationship of the identified person to the recipient.

15. A computer program product for determining message text content amount limits as a function of recipient context, the computer program product comprising:
- a computer readable storage medium having computer readable program code embodied therewith, the computer readable program code comprising instructions for execution by a processor that cause the processor to:
- in response to receipt of an electronic message, determine whether a physical proximity distance of a recipient of the electronic message to another, identified person is within a minimum specified threshold distance, and determine a reception device limit value that is applicable to a device currently used by the recipient to receive the electronic message as a function of an attribute of the device;
- determine an activity limit value as a function of an activity context of the recipient;
- determine a cognitive state message limit value as a function of a cognitive state of the recipient;
- set a threshold maximum content value as a function of the reception device limit value, the activity limit value and the cognitive state message limit value;
- in response to determining that the physical proximity distance to the identified person is within the minimum specified threshold distance, compare a total amount of text content of the message to a threshold maximum content value; and
- in response to determining that the total amount of the message text content exceeds the threshold maximum content value, notify a sender of the message that the threshold maximum content value currently applies to messages sent to the recipient.

16. The computer program product of claim 15, wherein the computer readable program code instructions for execution by the processor further cause the processor to notify the sender by displaying banner information in association with an entry field in a graphical user interface display used by the sender to compose and send messages to the recipient.

17. The computer program product of claim 15, wherein the computer readable program code instructions for execution by the processor further cause the processor to:
- in response to determining that the total amount of the message text content exceeds the threshold maximum content value, automatically revise the text content of the message by reducing the total text content to a reduced amount of the text content that does not exceed the threshold maximum content value; and
- deliver the message with the reduced amount of the text content to the recipient.

18. The computer program product of claim 15, wherein the computer readable program code instructions for execution by the processor further cause the processor to:
- determine that the cognitive state of the recipient matches a corresponding one of a group of emotional states that comprises upset, happy and calm emotional states; and
- set the cognitive state message limit value to a limit value that is associated to the matching corresponding one of the group of emotional states.

* * * * *